United States Patent
Nakajima (10) Patent No.: US 7,612,736 B2
(45) Date of Patent: Nov. 3, 2009

(54) LIGHT EMITTING UNIT

(75) Inventor: Chiaki Nakajima, Minato-ku (JP)

(73) Assignee: Komaden Corporation, Tokyo (JP)

( * ) Notice: Subject to any disclaimer, the term of this patent is extended or adjusted under 35 U.S.C. 154(b) by 440 days.

(21) Appl. No.: 10/545,793

(22) PCT Filed: Feb. 20, 2004

(86) PCT No.: PCT/JP2004/001959

§ 371 (c)(1),
(2), (4) Date: Aug. 17, 2005

(87) PCT Pub. No.: WO2004/075154

PCT Pub. Date: Sep. 2, 2004

(65) Prior Publication Data

US 2006/0244681 A1 Nov. 2, 2006

(30) Foreign Application Priority Data

Feb. 21, 2003 (JP) ............................. 2003-044060
Apr. 15, 2003 (JP) ............................. 2003-110446

(51) Int. Cl.
G09G 5/00 (2006.01)
G09G 3/32 (2006.01)

(52) U.S. Cl. ...................... 345/1.2; 345/1.3; 345/82; 345/83

(58) Field of Classification Search .................. 345/82, 345/76, 101, 102, 46, 1.2, 1.3, 83
See application file for complete search history.

(56) References Cited

U.S. PATENT DOCUMENTS 5,767,818 A 6/1998 Nishida
6,097,351 A 8/2000 Nishida
6,118,458 A * 9/2000 Kawai et al. ................. 345/473
6,340,868 B1 * 1/2002 Lys et al. .................. 315/185 S
7,057,583 B2 * 6/2006 Koll et al. ...................... 345/30
2002/0021269 A1 * 2/2002 Rast .............................. 345/82

FOREIGN PATENT DOCUMENTS

| JP | 5-199243 | 8/1993 |
|---|---|---|
| JP | 2000-221934 | 8/2000 |
| JP | 2001-514432 | 9/2001 |
| JP | 2002-318567 | 10/2002 |
| WO | 96/10244 A1 | 4/1996 |
| WO | 99/10867 A1 | 3/1999 |

* cited by examiner

Primary Examiner—Amare Mengistu
Assistant Examiner—Robert R Rainey
(74) Attorney, Agent, or Firm—Edwards Angell Palmer & Dodge LLP (57) ABSTRACT

A light-emitting unit capable of setting an address easily and reliably and checking the result of address setting. The light-emitting unit, such as an LED unit that constructs the unit of light emission of a display unit or the unit of light emission of an ornamental display, includes an infrared receiving element that receives data including an address transmitted by infrared light; an address storage section that stores the address; and a controller that recognizes an address from the data and stores the address in the address storage section. Preferably, the controller stores the light-emission patterns of a display LED for a normal address setting and an erroneous address setting, wherein when normal setting is recognized, the display LED emits light in a normal-setting emission pattern, and when an error is recognized, the display LED emits light in a error-setting emission pattern.

6 Claims, 4 Drawing Sheets

LIGHT EMITTING UNIT

FIELD OF THE INVENTION

The present invention relates to a light-emitting unit disposed lengthwise and crosswise in large numbers to construct an LED display unit or the like that displays images on a large screen.

DESCRIPTION OF THE RELATED ART

Figure 4:
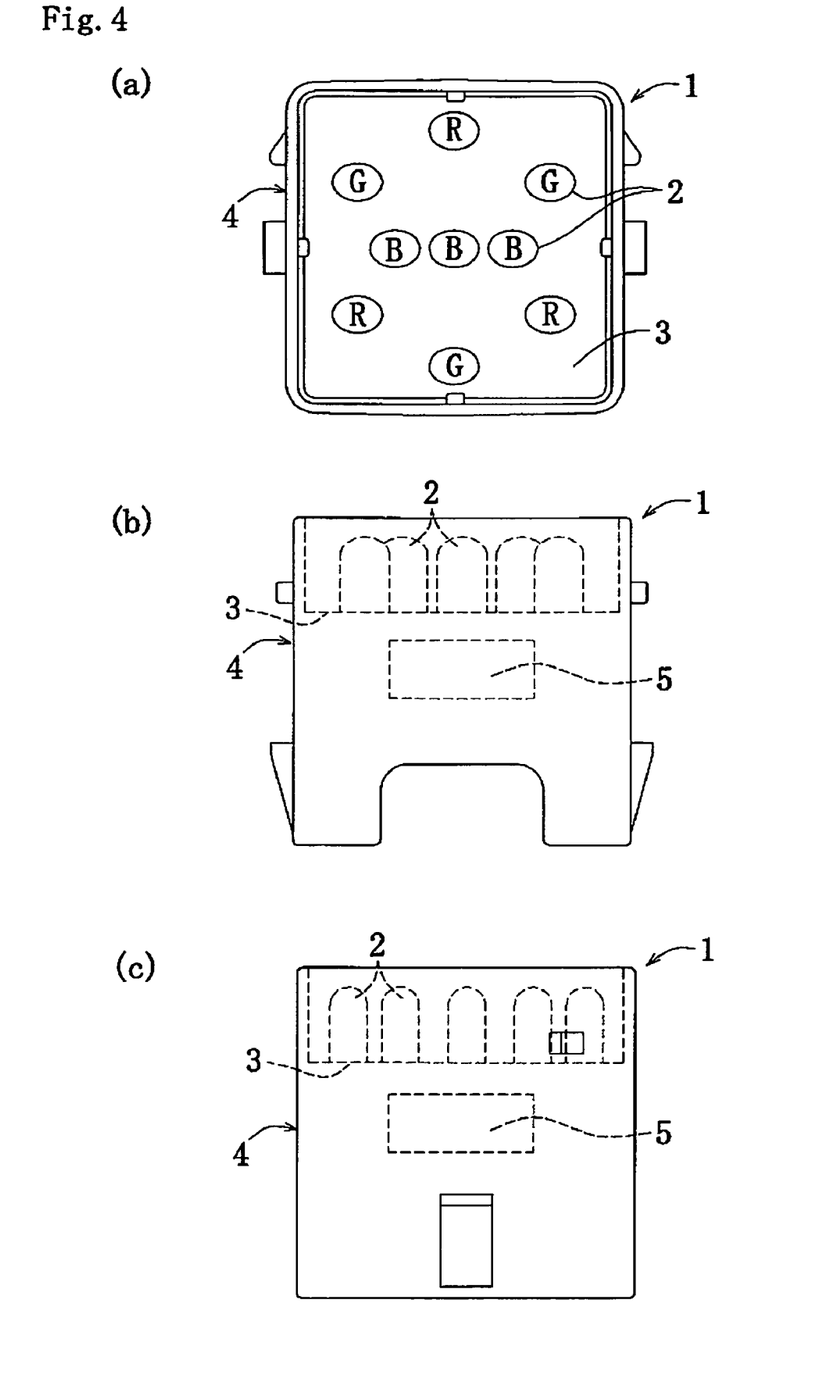
FIG. 4(a) is a plan view of a conventional LED unit.
FIG. 4(b) is a front view of the LED unit in FIG. 4(a)
FIG. 4(c) is a side view of the LED unit in FIG. 4(b).

Known light emitting units disposed lengthwise and crosswise in large numbers to construct an LED display unit that displays images on a large screen includes an LED unit 1 shown in FIG. 4. The LED unit 1 in FIG. 4 includes display LEDs 2 of the three primary colors, red (R), green (G), and blue (B), disposed on a substrate 3 such that they can be lit up. The display LEDs 2 and the substrate 3 are accommodated in a top-open box-shaped casing 4. The display LEDs 2 are disposed such that the direction of the light-emitting sections are oriented to the opening.

The casing 4 of the LED unit 1 contains a controller 5 including a microprocessor for controlling the light emission and driving of the display LEDs 2 and memories such as a program memory, and an address storage section (not shown) for storing set addresses. The address of the LED unit 1 is set by inputting with a DIP switch and is stored in an address storage section, as shown in p. 18 of Patent Document (JP-A-2001-514432). The LED unit 1, which has been addressed, is produced as a finished product in such a way that resin is injected onto the top of the substrate 3 and around the display LED 2 for rendering it waterproof.

In a display operation, a display control signal is sent to a set address via a wire connected to the LED unit 1, and the controller 5 causes a specified display LED 2 to emit light in response to the display control signal.

A reference technique in another technical field is disclosed in Patent Document 2 (JP-A-5-199243) which includes a structure in which the operation-display LED of a transmission terminal is used also as a light-signal receiving element in setting, changing, verifying the address by the transmission terminal connected to a transmission line, wherein when the operation-display LED is turned off, it receives the light-emission signal sent from a setting unit, and the received address is stored in an EEPROM, a structure in which when an error arises in the procedure of transmission, an error indication is displayed on the display of the setting unit, and a structure in which a transmission command for the setting unit to read the address optically outputted by the transmission terminal is emitted optically and the address of the transmission terminal is verified by the setting unit.

SUMMARY OF THE INVENTION

However, in the above-described manufacturing process in which the address of the LED unit 1 is set by a DIP switch and then sealing resin is provided to produce the LED unit 1 as a finished product, an address set by mistake during manufacturing cannot be corrected. Furthermore, an address set in each LED unit 1 must be administered at all times in the downstream process, thus requiring much labor for administration work.

The invention is proposed in consideration of the above problems and has an object the provision of a light-emitting unit which can be addressed easily and reliably, an in which the set address can be corrected easily.

A light-emitting unit according to the invention constructs the unit of light emission of a display unit or the unit of light emission of an ornamental display. The light-emitting unit includes an infrared receiving element that receives data including an address transmitted by infrared light; an address storage section that stores the address; and a controller that recognizes an address from the data and stores the address in the address storage section. The address storage section, which can rewrite the address, is preferable because it can write an appropriate address to the light-emitting unit as necessary. While the light-emitting unit is preferably an LED unit that uses an LED as a display light emitter, it may be another light emitter such as an incandescent light or a fluorescent light as necessary.

In the light-emitting unit according to the invention the data containing the address is data in a specific format whose correctness can be verified; and the controller verifies the correctness of the format of the data, wherein only when the correctness of the format is confirmed, the address is stored in the address storage section. The structure can prevent and unintended writing operation to the address storage section.

An appropriate structure may be employed for the verification of the format as follows: for example, a structure in which the controller stores decoding data that decodes an address from data in a specific format, decodes an address from the data in a specific format on the basis of the decoding data, verifies the format on the basis of at least the decoded address, and stores the address in the address storage section only when the correctness of the format can be confirmed; a structure in which, for the verification of the format based on the decoded address, for example, for a specific format in which there are multiple same addresses, which are converted in specified regularity, the consistency of the decoded addresses is checked, or the fact that all the decoded addresses are the same is confirmed; a structure in which the format is verified by sum check for the data in a specific format before decoding; or a structure in which data in a specific format having a parity bit, cyclic redundancy code (CRC) and so on is used.

In the light-emitting unit according to the invention the controller stores a predetermined time longer than the quiescent time of a display control signal of a display light emitter, and determines whether the quiescent mode is continued for more than the predetermined time period or over the predetermined time period immediately before the recognition of the data input, wherein only when the quiescent mode is continued for more the predetermined time period or over the predetermined time period, the controller recognizes the address from the data. This structure can prevent, for example, unintended writing operation to the address storage section in a normal display operation of the LED unit.

In the light-emitting unit according to the invention the controller determines whether the quiescent mode is continued during a necessary time from the recognition of the input of the data to the completion of the extraction of the address from the data, or from the recognition of the input of the data to the completion of the verification of the format of the data, wherein only when the quiescent mode is continued, the controller stores the address in the address storage section. This structure can prevent, for example, an unintended writing operation to the address storage section, for example, in a normal display operation of the light-emitting unit.

In the light-emitting unit according to the invention the controller stores the light-emission patterns of the display light emitter for a normal address setting an erroneous address setting, wherein when the normal setting is recognized, the display light emitter is lit up in a normal-setting emission pattern, and when an error is recognized, the display light emitter is lit up in a error-setting emission pattern. The normal address setting may be for a new setting or for rewriting. With such a structure, the result of address setting can be recognized obviously and instantly.

An appropriate light-emission pattern can be employed; for example, one or multiple display light emitters may be lit up at different number of times, time periods, and places. It is preferable to employ a structure in which, among multiple display emitters in different colors, a display light emitter of a specified color is lit up in a specified pattern or a structure in which multiple display light emitters in a specified color are lit up in a specified pattern in sequence. The light-emission pattern includes a case in which a desired display light emitter is lit up only one time.

The invention also includes a structure in which the structure of each invention is eliminated to a limit that offers part of the advantages into a superordinate concept; for example, a structure in which, in data setting by other than infrared light, the continuance of the quiescent mode immediately before the recognition of data input is confirmed and an address is then recognized; and a structure in which the display light emitter is lit up in a specified pattern according to the state of setting.

The light-emitting unit of the invention recognizes an address by receiving infrared light and sets the address or rewrite to the address, thus offering the advantage that it can set the address reliably and easily, and correct the set address easily.

With the structure in which the format of the received data is verified and the quiescent mode in address setting is checked, erroneous writing operation can be surely prevented, allowing correct address setting.

Because that an address which was set normally or rewritten can be checked by the light emission of the display LED in a specified pattern, the result of address setting or rewriting can be checked easily, obviously and instantly.

DETAILED DESCRIPTION OF AN EXEMPLARY EMBODIMENT

Figure 1:
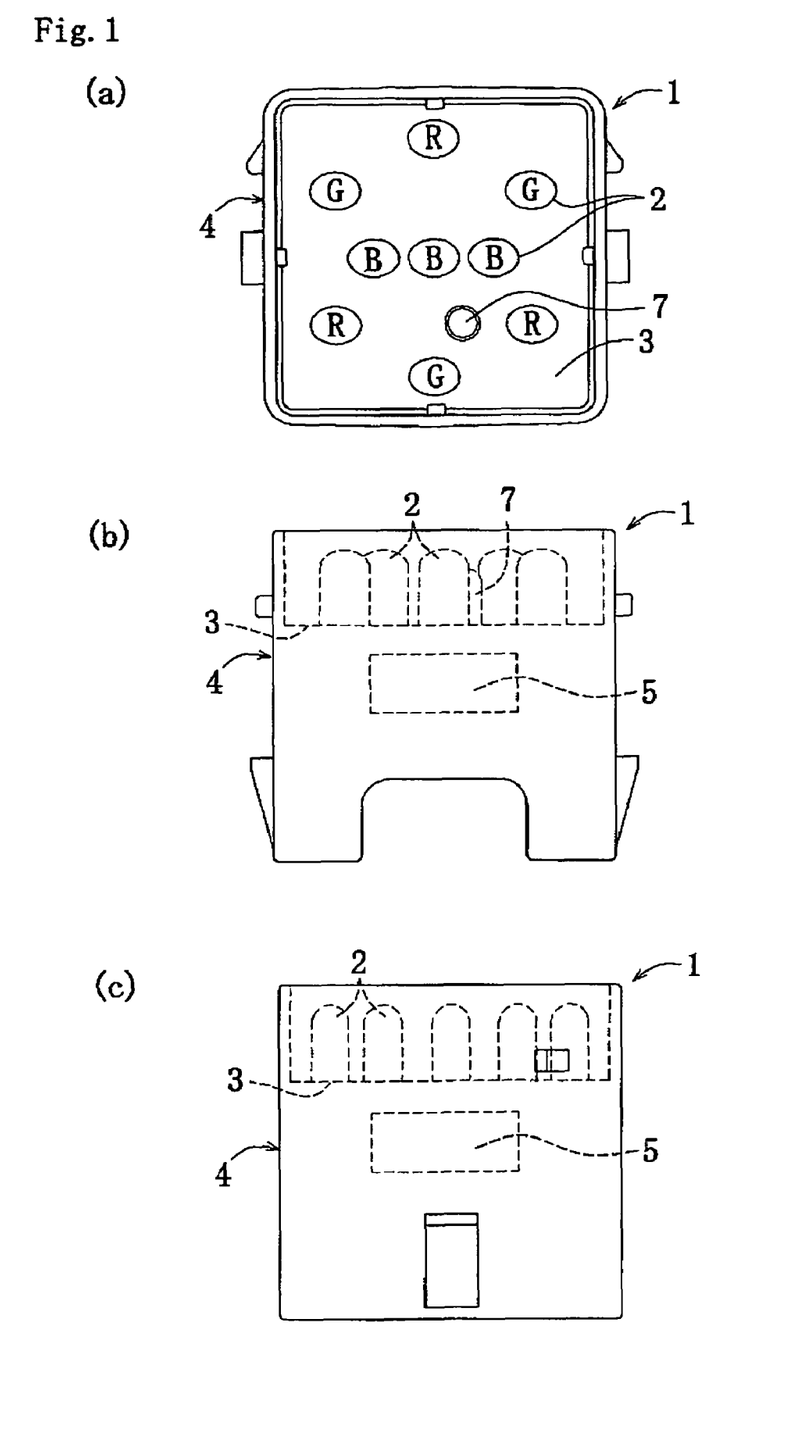
FIG. 1(a) is a plan view of an LED unit according to an embodiment of the invention.
FIG. 1(b) is a front view of the LED unit in FIG. 1(a)
FIG. 1(c) is a side view of the LED unit in FIG. 1(b)
Figure 2:
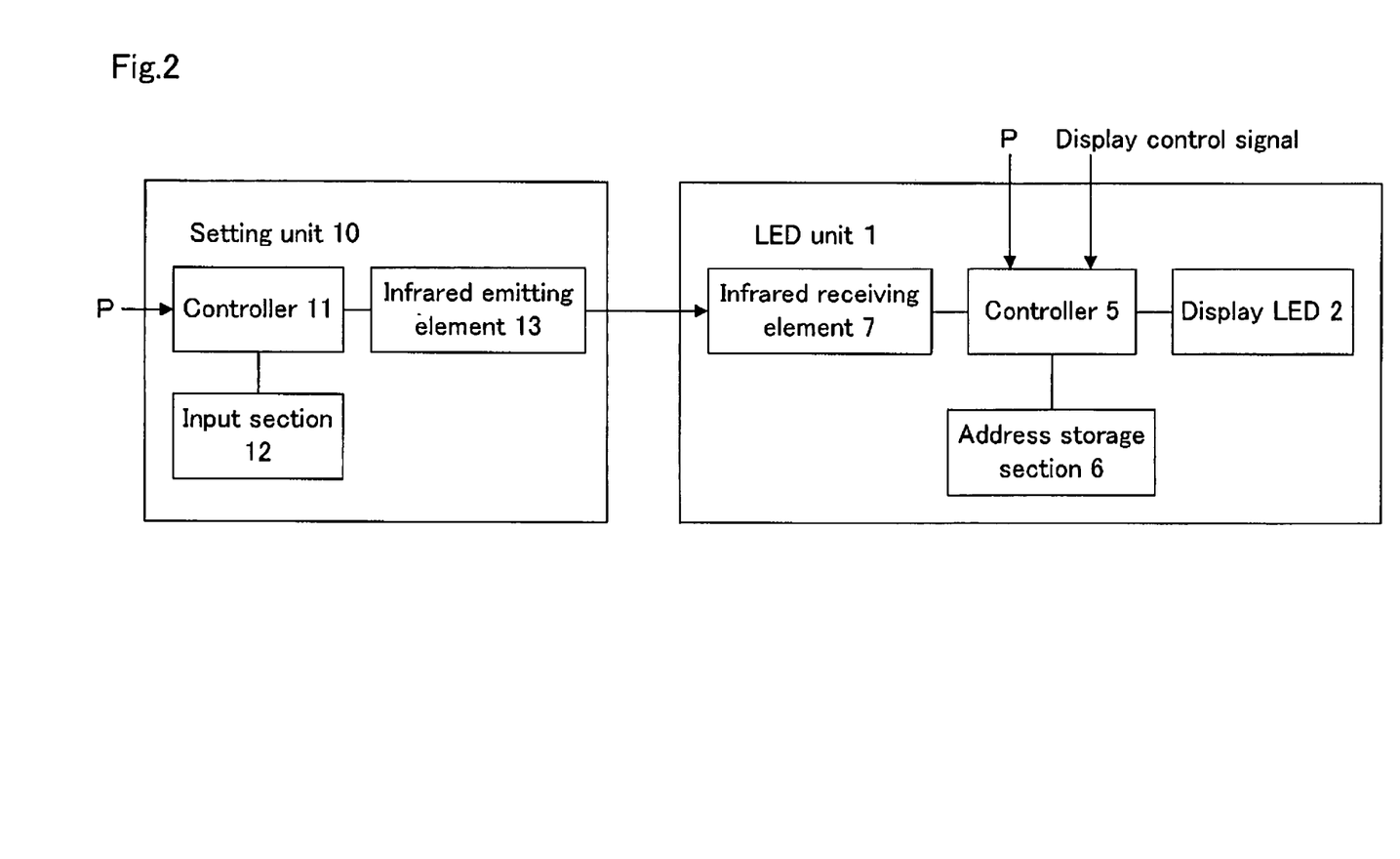
FIG. 2 is a block diagram of the LED unit and a setting unit according to the embodiment.

An embodiment of a light-emitting unit according to the invention and an address setting therefor will be described. FIG. 1 is a diagram of an LED unit that is an embodiment of the light-emitting unit. FIG. 2 is a block diagram of the LED unit and a setting unit according to the embodiment.

The LED unit 1 of the embodiment is disposed lengthwise and crosswise in large numbers, and constructs a light-emitting unit of an LED display unit that displays images on a large screen, whose appearance is substantially the same as that of the related art in FIG. 4. Specifically, as shown in FIG. 1, the LED unit 1 includes a collection of the image display LEDs 2 of the three primary colors, red (R), green (G), and blue (B), such that they are lit up, the display LEDs 2 being disposed in flat shape on specified portions on the substantially square substrate 3. The LED unit 1 of the embodiment has multiple display LEDs 2 of red, green, and blue colors, in which three blue LEDs are disposed in the center, around which three red LEDs and blue LEDs are disposed.

Furthermore, the LED unit 1 of the embodiment has an infrared receiving element 7 that receives a bit string in a specified format, to be described later, in position on the substrate 3. The display LED 2, the infrared receiving element 7, and the substrate 3 are accommodated in the top-open box casing 4. The display LED 2 is disposed with the direction of the light-emitting section directed to the opening. The infrared receiving element 7 is disposed with the receiving section directed to the opening.

As shown in FIG. 2, the casing 4 of the LED unit 1 accommodates a controller 5 including a microprocessor for controlling specified operations, such as the confirmation of a quiescent mode (to be described later), recognition, decoding, verification of the bit string in a specified format, writing and comparison of addresses, and driving of the display LED 2; memories such as a program memory for storing specified control programs that cooperate with the microprocessor, a working memory and so on, and memories for storing predetermined light-emission patterns, a predetermined time in Condition 1 (to be described later), necessary data and so on; and an address storage section 6 for storing set addresses in a rewritable manner. The address storage section 6 is a memory such as an EEPROM that stores addresses electrically in a rewritable manner, which is capable of multiple times of rewriting.

Between the infrared receiving element 7 and the controller 5 is provided a signal converter circuit (not shown) for converting an optical signal to an electrical signal, whereby the address in an infrared signal that the infrared receiving element 7 receives or a bit string in a specified format is converted to an electrical signal through the signal converter circuit, and it is inputted to the controller 5. The signal converter circuit may be an appropriate existing signal converter circuit; for example, the circuit structure in Patent Document 2 can be employed. Reference symbol P is a power source, which supplies a current that the LED unit 1, or the controller 5 and so on need for specified operations.

In normal display operation, the LED unit 1 receives a display control signal for the address set in the address storage section 6 through a wire connected to the LED unit 1, and the controller 5 makes a specified display LED 2 emit light in response to the input of the display control signal.

As shown in FIG. 2, a setting unit 10 includes a controller 11 including a microprocessor for controlling specified operations, such as storing the address by the setting unit 10, coding the address to a bit string in a specified format, and transmission, memories, such as a program memory for storing specified control programs that cooperate with the microprocessor, working memories and so on, and memories for storing necessary data and addresses; an input section 12 capable of specified input such as a switch for inputting addresses to the setting unit 10 and a switch for transmitting the inputted addresses or the bit string in a specific format; and an infrared emitting element 13 for transmitting addresses or the bit string in a specific format by emitting infrared light.

Between the controller 11 and the infrared emitting element 13 is provided a signal converter circuit (not shown) for converting an electrical signal to an optical signal, whereby the address in an electrical signal outputted from the controller 11 or a bit string in a specified format is converted to an optical signal through the signal converter circuit, and it is emitted from the infrared emitting element 13 for transmission. The signal converter circuit may be an appropriate existing signal converter circuit; for example, the circuit structure in Patent Document 2 can be used. Reference symbol P is a power source, which supplies a current that the setting unit 10, or the controller 11 and so on need for specified operations.

Figure 3:
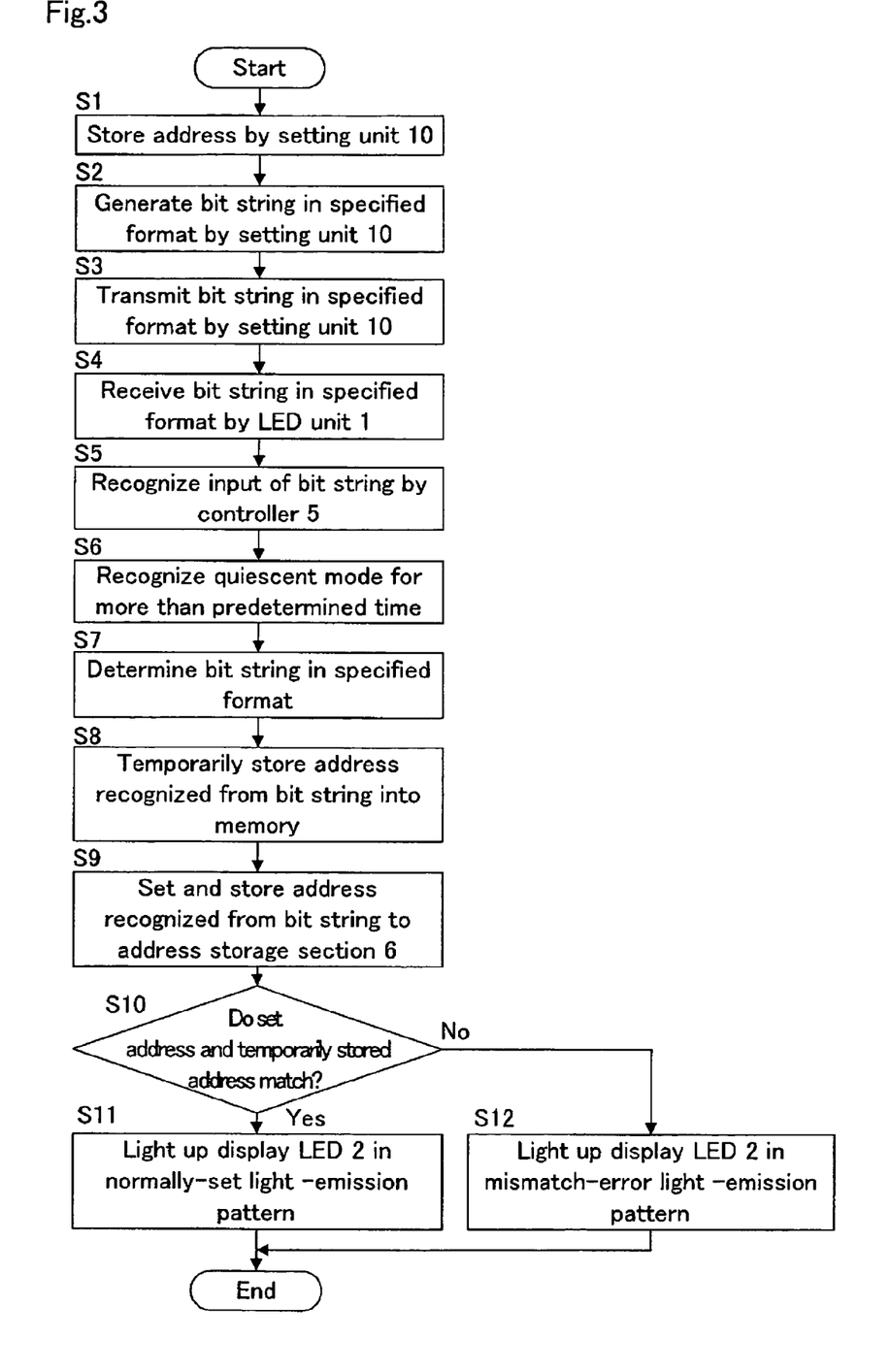
FIG. 3 is a flowchart for the address setting for the LED unit according to the embodiment.

Setting an address to the LED unit 1 with the setting unit 10 will now be described. FIG. 3 is a flowchart for the address setting for the LED unit according to the embodiment.

As a precondition, the setting or writing of an address to the LED unit 1 is allowed only when Conditions 1 and 2 are satisfied. Condition 1: the controller 5 is in quiescent mode in which it does not recognize the input of a display control signal and so on for a predetermined time, about one second, set in a storage region of the memory in the controller 5 immediately before the controller 5 recognizes the input of a bit string in a specific format by receiving infrared light, as will be described later, Condition 2: the controller 5 continues the quiescent mode in which it does not recognize the input of a display control signal and so on for the necessary time from the time when the controller 5 recognizes the input of a bit string until the time when analytical determination by the controller 5 whether the bit string follows the specific format is completed or until the time when extraction of the address from the bit string after the analytical determination is completed.

In other words, in the LED unit 1, setting or writing of an address to the address storage section 6 is allowed only when a quiescent mode is continued in which the controller 5 does not recognize the input of a display control signal and so on continuously for the predetermined time immediately before the controller 5 recognizes the input of a bit string, and the necessary time from the time when the controller 5 recognizes the input of a bit string until the time when the analytical determination by the controller 5 whether the bit string follows the specific format is completed, or the extraction of the address is completed.

The predetermined time in Condition 1 is set longer than the quiescent time contained intermittently in the display control signal, for example, about 100 ms to 10 sec, for the quiescent time for the display control signal from about 1 μs to 100 ms based on the image-data update cycle. It is preferable to set the predetermined time in Condition 1 to the order of ten times as long as the no display control signal time for security, and to set so long that does not decrease working efficiency. The necessary time in Condition 2 depends on the format of the specific format and the bit rate, for example, from about 1 ms to 1 sec.

When setting an address to the LED unit 1 by the setting unit 10, the setter of the address disposes the setting unit 10 in a position or at a distance that allows good infrared communication with the LED unit 1, and inputs the address to be set to the setting unit 10 through the input section 12 of the setting unit 10. The controller 11 of the setting unit 10 recognizes the inputted address in response to the input of the address and stores it in a specified storage region of the memory in the controller 11 (S1).

After the address setter inputs the address to the LED unit 1 through the input section 12, the controller 11 in the setting unit 10 reads the address stored in the specified storage region, and encodes the address on the basis of stored encoding data to generate a bit string in a specific format or data in a specific format for emitting infrared light (S2). The controller 11 then drives the infrared emitting element 13 to emit infrared light, applies the infrared light to the infrared receiving element 7 in the LED unit 1, thereby transmitting the bit string or data in a specific format to the LED unit (S3). In the transmission, the signal converter circuit converts the bit string outputted from the controller 11 from an electrical signal to an optical signal.

In the generation of the bit string or data in a specific format, the controller 11 generates, for example, 256 bytes of one-byte address date that stores a specific address, in other words, 256 items of the address data that stores the same data in cooperation with a given program and encoding data stored in the memory, performs binary addition to the 1st to 256th address data in sequence to generate address conversion data, and sets the address conversion data between the start bit and the stop bit in start-stop synchronization. The controller 11 then calculates the total value of all the address conversion data used in sum check, and sets one-byte total-value data that stores the total value between the start bit and the stop bit in start-stop synchronization, thereby generating a very redundant bit string or data in a specific format on the basis of the 1st to 256th address conversion data, the 257th total-value data and so on.

The LED unit 1 receives the bit string or data in a specific format transmitted from the setting unit 10 with the infrared receiving element 7 (S4), and converts the optical signal to an electrical signal via the signal converter circuit. Then the bit string converted to the electrical signal is inputted to the controller 5. The controller 5 in the LED unit 1 recognizes the input of the bit string or data (S5), and determines, immediately before the recognition of the bit string, whether the controller 5 is in quiescent mode in which it has not recognized the input of a signal for a specified time period or more in Condition 1 (S6), wherein when it is not in quiescent mode, the inputted string or data is deleted or abandoned. The lapse of the specified quiescent time is recognized by using a CPU clock, a built-in timer, etc.

When it is in quiescent mode or Condition 1 is satisfied, the controller 5 in the LED unit 1 analyzes to determine whether the bit string or data conforms to the specific format (S7). In the analytical determination, the controller 5 recognizes the address conversion data in the inputted bit string or data in cooperation with the given program stored in the memory, and calculates the total value thereof. The controller 5 also recognizes the received total value from the total-value data in the inputted bit string or data, and compares the calculated total value the received total value by comparing the lower bits and the like to determine whether the total values agree with each other by sum check, thereby verifying the format.

The controller 5 performs binary subtraction to the recognized 1st to 256th address conversion data in sequence on the basis of the decoding data corresponding to the encoding data of the setting unit 10 to acquire address data from each address conversion data, and compares the acquired address data to determine whether the address data is the same address or the same address data, thereby verifying the format.

As a result of analytical determination by the format verification, when the controller 5 recognized that the total values do not agree with each other by sum check or address data different from the foregoing address data is contained and so determines that the bit string or data does not conform to the specific format, the input bit string or data is deleted or abandoned.

As a result of analytical determination by the format verification, when the controller 5 recognized that the total values agree with each other by sum check, and the address data is the same address or the same address data and so determines that the bit string or data conforms to the specific format, the controller 5 recognizes the address in the address data, temporarily stores the recognized address in a specific storage region of the memory in the controller 5 (S8), and writes the recognized address in a specified storage region of the address storage section 6 to store it (S9). When a set address is present in the specified storage region of the address storage section 6 in the writing, the controller 5 executes the process of rewriting the present address to the recognized address.

Then the controller 5 of the LED unit 1 reads the set address written to the specified storage region of the address storage section 6 and stored therein, and determines whether the set address agrees with the address that is temporarily stored in the specified storage region of the memory in the controller 5 by comparison (S10). As a result of the comparison, when the read set address and the temporarily stored address agrees with each other, the controller 5 reads a normally set specified light-emission pattern stored in a storage region of the memory in correspondence with normal address setting, and drives the display LED 2 according to the normally-set light-emission pattern to emit light (S11).

On the other hand, as a result of the comparison, when the read set address and the temporarily stored address do not agrees with each other, the controller 5 reads a mismatch-error light-emission pattern stored in a storage region of the memory in correspondence with the mismatch of address, and drives the display LED 2 according to the mismatch-error light-emission pattern to emit light (S12).

When the address storage section 6 does not normally operate when writing an address to the address storage section 6 or reading a set address stored in the address storage section 6 to compare with the temporarily stored address, the controller 5 reads a memory-abnormality-error-light-emission pattern stored in a specified storage region of the memory in correspondence with the abnormality of the address storage section 6, and drives the display LED 2 according to the memory-abnormality-error light-emission pattern to emit light. In addition, for example, when a memory that outputs the status to the controller 5, such as a general serial EEPROM, is used as the address storage section 6, the controller 5 can determine a memory abnormality error that the address storage section 6 does not normally operate, from the status outputted from the address storage section 6 to the controller 5 in writing.

The LED unit 1 according to the embodiment receives data containing address information via infrared light by the infrared receiving element 7, thereby being allowed to set the address into the address storage section 6 on the basis of the data or to rewrite the address in the address storage section 6. The LED unit 1 can also rewrite the address in the address storage section 6, easily set an address unique to the LED unit 1, or easily correct the set address.

For example, after the LED unit 1 that is the unit of light emission is disposed crosswise and lengthwise at specified intervals or adjacent to one another crosswise and lengthwise to form an LED display unit, the address setting or resetting for the LED unit 1 can easily be performed without electrical wire connection with the setting unit 10, allowing flexible setting for various environments. Also the work of setting the address before the manufacture or completion of the LED unit 1 and the work of administering the address during the manufacture can be omitted, increasing working efficiency.

Since a necessary number of LED units 1 can be addressed and used after the LED units 1 have been mass-produced, the LED units 1 can be manufactured at a high yield rate and used effectively. Also a water-proof structure with sealing resin or the like, which is difficult for a DIP switch, can easily be provided.

As shown in FIG. 2, a display control signal is constantly inputted to the controller 5 of the LED unit 1 in a normal display operation. Although the display control signal includes intermittent very short quiescent time, the controller 5 is prevented from misconceiving the quiescent time of the display control signal as the predetermined time in a normal display operation to cause an unintended writing operation according to the following display control signal by setting the predetermined time in Condition 1 longer than the quiescent time of the display control signal. Since the quiescent time of the display control signal is very short, there is generally no possibility in normal display operation that the quiescent time may continue for the predetermined time in Condition 2 and as such, the occurrence of unintended writing operation due to the display control signal can be prevented.

In the LED unit 1 according to the embodiment, the occurrence of unintended writing operation to the address storage section 6 can be reliably prevented with high safety, for example, in the normal display operation of the LED unit 1 by making a request for satisfying both of Conditions 1 and 2 in address setting or writing. For example, only with Condition 2, in the event that a quiescent time continues for a specified time from the recognition of a signal by the controller 5, there remains the possibility of unintended writing operation. However, such writing operation can be prevented with reliability owing to Condition 1.

Furthermore, when an address to be set to the LED unit 1 is sent from the setting unit 10 by infrared light, the address is sent in a bit string of a specific format that the LED unit 1 can verify, the correctness of the address is verified by determining whether the bit string received by the LED unit 1 conforms to a specific format, wherein only when it conforms to the specific format, an address extracted from the bit string is set. Accordingly, for example, when the infrared receiving element 7 receives bit strings of various disturbance lights at random in normal display operation or maintenance etc., the possibility of writing the information in the received bit strings as an address by misconception can be eliminated or minimized.

By the combination of format verification for the bit string and the writing operation that satisfies Conditions 1 and 2, in other words, by requiring to satisfy the condition for permission by verifying a specific format or signal pattern and the condition for permission by a specific environment, unintended writing at the time other than address setting or erroneous writing to the address storage section 6 can be prevented reliably even in any situation after the LED display unit or the LED unit 1 is powered on.

Only in the quiescent time or when the Condition 1 is satisfied, the subsequent analytical determination on a bit string and so forth are executed. Accordingly, for example, the situation in which the analysis is performed with the quiescent time of the display control signal misperceived can be prevented with reliability, so that needles analyzing process can be prevented and complication of the control program such as a program adaptable to such analyzing process can be prevented.

With this structure, the display LED 2 etc. emits light in a specific emission pattern according to the result of address setting. Accordingly, the setter of the address can correctly and instantly recognize that the LED unit 1 was correctly addressed by the light emission in a normally set emission pattern, that the LED unit 1 could not be addressed correctly and a mismatch error has occurred as error type by the light emission in a mismatch-error emission pattern, and that the LED unit 1 could not be addressed correctly and a memory-abnormality error has been generated by the light emission in a memory-abnormality-error emission pattern. Thus, correct measures depending on error types can be taken immediately.

The LED unit 1 according to the embodiment has been described for the structure in which the display LED 2 emits light in predetermined patterns for a mismatch error and a memory-abnormality error. Also for other errors, specified emission patterns for the display LED 2, which correspond to the error types in addressing the storage section 6, are set in a storage region of the memory in the controller 5, and the controller 5 reads a light-emission pattern corresponding to the error type and as such, the display LED 2 can emit light in the light-emission pattern.

The error type corresponding to the same light-emission pattern to be set can be classified as appropriate. For example, the controller 5 may read the set light-emission pattern on the basis of information on the writing and reading operation, depending on whether the error type is a memory-abnormality error when the address storage section 6 does not react correctly when an address is written to a specified region of the address storage section 6 or a memory-abnormality error when the address storage section 6 did not react correctly when a set address stored in the address storage section 6 is read to compare it with a temporarily stored address. Furthermore, it is also possible to set the same light-emission pattern for all the errors, thus setting only two light-emission patterns for a normal setting and an error.

The light-emission pattern for the display LED 2 which indicates the result of address setting can be an appropriate light-emission pattern that allows recognition of the result of address setting. For example, when an address is set normally, a green display LED is lit up for one second after a blue display LED was lit up for one second; for a mismatch error in which the read set address and the temporarily stored address do not match, a red display LED is lit up for one second after a blue display LED was lit up for one second; for a memory-abnormality error in which the address storage section 6 does not react normally, a green display LED is lit up for one second after a red display LED was lit up for one second.

For example, when a light-receiving LED in a specified color, such as yellow, or a transmitting-receiving LED is used as the infrared receiving element 7, a specified light-emission pattern of the display LED 2 and a specified light-emission pattern of the receiving LED etc. serving as the infrared receiving element 7 corresponding to the state of address setting and so on are set in a storage region of the memory in the controller 5; the controller 5 reads the light-emission pattern of the display LED 2 or the receiving LED and so on depending on the result of the address setting, whether normal setting or an error of a specified type; and so the display LED 2, the receiving LED or the like can emit light. Also, light emission of both the display LED 2 and the receiving LED in a predetermined light-emission pattern can be used. This structure also offers the same advantages as those of light emission only in the light-emission pattern by the display LED 2. LED 2 and the receiving LED and so on are as follows: when an address is set normally, a green display LED is lit up for one second after a blue display LED was lit up for one second; for a mismatch error in which the read set address and the temporarily stored address do not match, a red display LED is lit up for one second after a blue display LED was lit up for one second; for a memory-abnormality error in which the address storage section 6 does not react normally, a receiving LED serving as the infrared receiving element 7 or a transmitting and receiving yellow LED is lit up for one second.

While the LED unit 1 according to the embodiment includes a collection of multiple displays LED 2 of RGB, the LED unit of the invention is not limited to the embodiment but may include only one LED.

While the embodiment has been described for the LED unit 1 that constructs an LED display unit that displays images on a large screen, the invention may adopt the same structure for a LED for ornamental purposes such as illumination. For example, the infrared receiving element of the ornamental display LED unit receives infrared light including address information, a storage section stores the address, and the ornamental display LED emits light in a specified pattern when address setting is performed normally.

The encoding of data by the setting unit 10 and the decoding of data by the LED unit 1 can have an appropriate structure in which the LED unit 1 can verify the correctness of the received data, in addition to the above-described embodiment. An appropriate structure may be employed for the verification of the format. For example, a parity bit, a cyclic redundancy code (CRC) and so on can be used.

While the LED unit 1 according to the embodiment has been described for a structure in which address setting or writing is executed when the foregoing Conditions 1 and 2 are satisfied, a structure may be possible in which address setting or writing is executed when either of the Conditions 1 and 2 is satisfied. For example, the invention may have a structure in which at the point in time when the Condition 1 is satisfied and so the controller 5 recognizes the input of the bit string or data, the controller 5 ignores or refuses the input of a display control signal and does not require the satisfaction of the Condition 2.

INDUSTRIAL APPLICABILITY

The invention can be applied to, for example, a light-emitting unit disposed lengthwise and crosswise in large numbers to construct a large-screen LED display unit.

The invention claimed is:

1. A light-emitting unit constructing the unit of light emission of a display unit or the unit of light emission of an ornamental display, comprising:
    an infrared receiving element that receives data including an address transmitted by infrared light;
    an address storage section that stores the address; and
    a controller that recognizes an address from the data and stores the address in the address storage section,
    wherein the data containing the address is data in a specific format whose correctness can be verified and the controller verifies the correctness of the format of the data,
    wherein only when the correctness of the format is confirmed, the address is stored in the address storage section,
    wherein the controller stores a predetermined time longer than the quiescent time of a display control signal of a display light emitter, and determines whether the quiescent mode is continued for more than the predetermined time period or over the predetermined time period immediately before the recognition of the data input, and
    wherein only when the quiescent mode is continued for more than the predetermined time period or over the predetermined time period, the controller recognizes the address from the data.

2. The light-emitting unit according to claim 1,
    wherein the controller determines whether the quiescent mode is continued during a necessary time from the recognition of the input of the data to the completion of the extraction of the address from the data, or from the recognition of the input of the data to the completion of the verification of the format of the data, and wherein only when the quiescent mode is continued, the controller stores the address in the address storage section.

3. The light-emitting unit according to claim 2, wherein the controller stores the light-emission patterns of the display light emitter for normal address setting and erroneous address setting, and wherein when normal a setting is recognized, the display light emitter is lit up in a normal-setting emission pattern, and when an error is recognized, the display light emitter is lit up in a error-setting emission pattern.

4. The light-emitting unit according to claim 1, wherein the controller stores the light-emission patterns of the display light emitter for normal address setting and erroneous address setting, and wherein when normal a setting is recognized, the display light emitter is lit up in a normal-setting emission pattern, and when an error is recognized, the display light emitter is lit up in a error-setting emission pattern.

5. A light-emitting unit, constructing the unit of light emission of a display unit or the unit of light emission of an ornamental display, comprising:

an infrared receiving element that receives data including an address transmitted by infrared light;

an address storage section that stores the address; and a controller that recognizes an address from the data and stores the address in the address storage section, wherein the data containing the address is data in a specific format whose correctness can be verified and the controller verifies the correctness of the format of the data, wherein only when the correctness of the format is confirmed, the address is stored in the address storage section, wherein the controller determines whether the quiescent mode is continued during a necessary time from the recognition of the input of the data to the completion of the extraction of the address from the data, or from the recognition of the input of the data to the completion of the verification of the format of the data, and wherein only when the quiescent mode is continued, the controller stores the address in the address storage section.

6. The light-emitting unit according to claim 5, wherein the controller stores the light-emission patterns of the display light emitter for normal address setting and erroneous address setting, and wherein when normal a setting is recognized, the display light emitter is lit up in a normal-setting emission pattern, and when an error is recognized, the display light emitter is lit up in a error-setting emission pattern.

* * * * *